United States Patent

[11] 3,613,763

| [72] | Inventor | Henry R. Fletcher, deceased<br>late of Birmingham, England by Agnes<br>Marion Fletcher, legal representative |
|---|---|---|
| [21] | Appl. No. | 22,717 |
| [22] | Filed | July 16, 1969 |
| [45] | Patented | Oct. 19, 1971 |
| [73] | Assignee | Dunlop Holdings Limited |
| [32] | Priority | July 16, 1968 |
| [33] | | Great Britain |
| [31] | | 33,746/68 |

[54] PNEUMATIC TIRES
16 Claims, 10 Drawing Figs.

| [52] | U.S. Cl. | 152/359 |
|---|---|---|
| [51] | Int. Cl. | B60c 9/12 |
| [50] | Field of Search | 152/357, 359, 361 |

[56] References Cited
UNITED STATES PATENTS

| 2,792,868 | 5/1957 | Benson | 152/357 |
|---|---|---|---|
| 2,987,095 | 6/1961 | Toulmin, Jr. | 152/357 |
| 3,002,546 | 10/1961 | Limmer | 152/361 |
| 3,032,963 | 5/1962 | Fenner | 152/357 |

*Primary Examiner*—James B. Marbert
*Attorney*—Stevens, Davis, Miller & Mosher

ABSTRACT: A pneumatic tire comprising at least one fold reinforcement layer e.g. a breaker formed with at least one fold, the layer comprising steel wire cords disposed in parallel side-by-side relationship, the individual wires in the cords having a diameter of substantially 0.003 of an inch or less.

PNEUMATIC TIRES

This invention relates to pneumatic tires. According to the invention there is provided a pneumatic tire comprising at least one reinforcement layer having at least one fold therein, the said layer comprising steel wire cords disposed in parallel side-by-side relationship, the individual wires in the cords having a diameter of substantially 0.003 of an inch or less. For example, the wires may have a diameter of substantially 0.0016 of an inch.

Examples of a layer according to the invention are a breaker layer, a chafer strip, a tread reinforcement layer, a filler strip and a carcass ply, especially the turnup thereof.

The said layer may comprise rubberized steel cord material produced by a method as described in the assignee's copending Pat. application Ser. No. 819,983 filed Apr. 28, 1969.

The tire may incorporate at least one unfolded layer which may comprise steel wire cords disposed in parallel side-by-side relationship, the individual wires in the cords having a diameter of substantially 0.003 of an inch or less. Alternatively, the individual wires in the unfolded layer may have a diameter greater than 0.003 of an inch e.g. 0.0059 of an inch.

Several examples of the invention will now be described with reference to the accompanying drawings of which:

Figure 1:
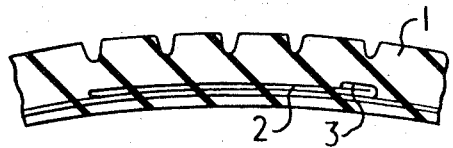
FIGS. 1 to 9 show axial cross sections of parts of the crown regions of tires containing breaker layers folded into various configurations.
Figure 2:
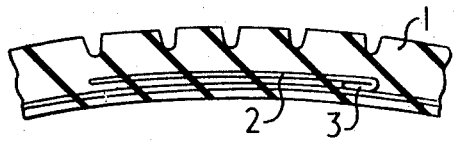
Figure 3:
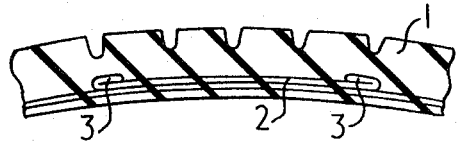
Figure 4:
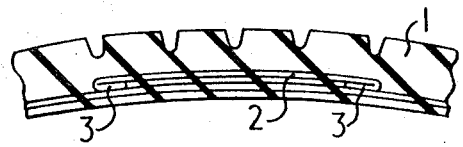
Figure 5:
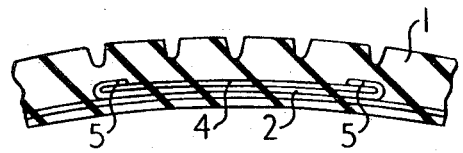
Figure 6:
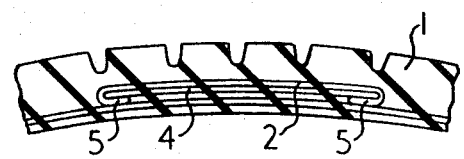

The first example of the invention shown in FIGS. 1 to 4 comprises a pneumatic tire incorporating in its tread 1 a breaker layer 2, comprising steel wire cords disposed in parallel side-by-side relationship, the individual wires in the cords having a diameter of substantially 0.003 of an inch or less. The breaker layer 2 is formed with a fold 3 on one (FIGS. 1 and 2) or both (FIGS. 3 and 4) circumferentially extending edges, in either a radially inwardly (FIGS. 2 and 4) or radially outwardly (FIGS. 1 and 3) direction. In the instances where both edges are folded, the axially outer regions of the tread 1 are more stiff than the central crown region thereof. In the instance where only one edge is folded only the axially outer region of the tread corresponding to the folded edge is more stiff and this asymmetry may be desirable e.g., to enhance the cornering properties of tires used on high performance cars. The area adjacent the folded edge is stiffer than an edge which is merely cut i.e., not folded. As shown in FIGS. 5 and 6 the tire may also incorporate at least one other breaker layer 4 located either radially outwardly (FIG. 5) or radially inwardly (FIG. 6) of the first layer 3, comprising steel wire cords disposed in parallel side-by-side relationship, the individual wires of this second layer 4 having a diameter either greater or less than 0.003 of an inch. The axial width of the second layer 4 is less than that of the first folded layer 2 and the edges 5 of the folded layer embrace the cut edges of the second layer 4, thus reducing the possibility of an internal rupture.

Figure 7:
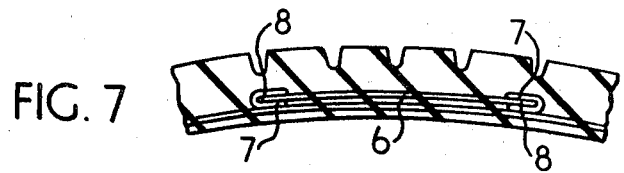

A second example of the invention show in FIG. 7 comprises a pneumatic tire incorporating in its tread 1 an unfolded breaker layer 6 comprising steel wire cords disposed in parallel side-by-side relationship, the individual wires of this layer having a diameter either greater or less than 0.003 of an inch. At each circumferentially extending cut edge of this breaker 6 layer there is a relatively narrow strip 8 of rubberized cord material comprising steel wire cords disposed in parallel side-by-side relationship, the individual wires of the cords having a diameter of substantially 0.003 of an inch or less, each strip being formed with at least one circumferentially extending fold and located so as to embrace and thereby protect the said cut edges.

Figure 8:
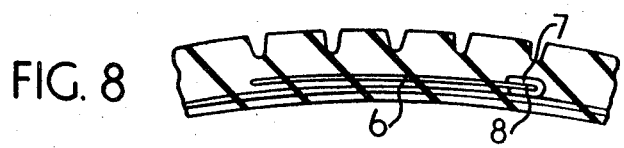

As a modification shown in FIG. 8 of this second example only one edge 7 of the breaker 6 is provided with a strip 8, thus causing the tire tread 1 to be stiffer on one side than the other. As aforementioned this asymmetry may be desirable in some tires.

The advantage of using a layer incorporating relatively thin wires rather than the more conventional larger diameter wires is that the layer is more flexible and less likely to fatigue or buckle. Because of the increased flexibility and the increased surface area of the cords the fold is less likely to become unstuck and hence the fold may be narrower than if the layer was of larger diameter wires. There is thus a saving in material and hence a reduction in cost and weight, compared with cords incorporating larger diameter wires. The proportional reduction may depend on several factors, e.g., the type of rubber, the method of forming the fold, and the cord angles.

Figure 9:
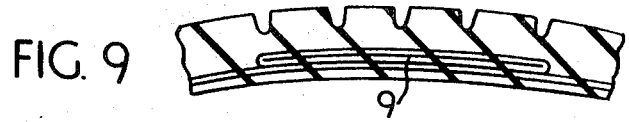

A third example shown in FIG. 9 of the invention comprises a pneumatic tire incorporating in its tread 1 at least one breaker layer 9 in the form of a squashed tube, which has the appearance in cross section of an endless flat loop, and which extends circumferentially of the tire, the said layer being reinforced with steel wire cords disposed in parallel side-by-side relationship, the individual wires in the cords having a diameter of substantially 0.003 of an inch or less.

Figure 10:
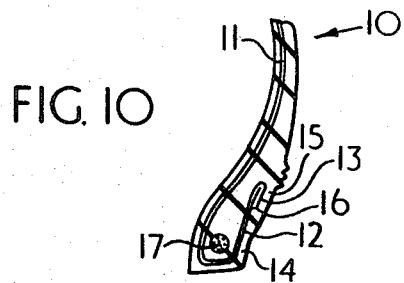
FIG. 10 shows an axial cross section of a bead region and part of a lower sidewall of a tire according to the invention.

A fourth example shown in FIG. 10 of the invention comprises a pneumatic tire 10 having at least one carcass ply 11 comprising steel wire cords disposed in parallel side-by-side relationship, the individual wires in the cords having a diameter of substantially 0.003 of an inch or less, the carcass ply having a turnup 12 which is formed with at least one circumferentially extending fold 13 located radially outwardly of the bead region 14 in the lower sidewall 15.

The advantage of this construction over tires with a ply of relatively thicker wires which is unfolded is that the cut edge 16 of the ply 11 is located nearer the bead core 17 and since this part of the tire flexes less than positions disposed more radially outwardly there is less likelihood of internal rupture.

As a modification (not shown) of the fourth example the ply turnup may be of conventional unfolded form and a chafer strip, formed with a circumferentially extending fold is located axially outwardly of the turnup. The chafer strip is reinforced with steel wire cords disposed in parallel side-by-side relationship, the individual wires in the cords having a diameter of substantially 0.003 of an inch or less.

A fifth example (not illustrated) comprises a tire incorporating circumferentially extending reinforcement layer in the form of a band or strip e.g. a breaker, formed from convolutions of steel wire cords comprising individual wires having a diameter of substantially 0.003 of an inch or less progressively wound to extend obliquely in continuous lengths from one side of the band or strip to the other and back in zigzag formation, the included angle between successive lengths measured adjacent to the peripheral edge of the winding, being substantially less than 180° and successive convolutions being slightly displaced so that they are distributed substantially uniformly around the finished band or strip, the finished band or strip, having at any transverse cross section an inner surface of parallel lengths of filamentary material lying obliquely and in an opposed direction to adjacent supposed parallel lengths of filamentary material forming an outer surface. A band or strip of similar arrangement is illustrated in U.S. Pat. No. 808,341.

In all the examples just described the reinforcement i.e., breaker, carcass ply, strip or band comprises 0.038 diameter steel cords each comprising two yarns each of which incorporates 141 individual wires 0.0016 in diameter, the yarns being folded together with substantially 7 t½turns per inch to form the cord and the twist of the wires, as they lie in the cord, being substantially zero.

In all examples of tires according to the invention there is the advantage that at the fold the radius of the fold bend is relatively small compared with that of layers formed with larger diameter wires and there is thus less material in this bend. The bend itself is relatively less stiff since there is less deformation of the cords and overall the change of stiffness at the edge of the layer is less marked. This is especially advantageous at a breaker edge and a ply turnup edge.

The cord comprising individual wires having a diameter of 0.003 of an inch or less is more flexible than the cords comprising larger diameter wires used hitherto, and the layer or layers may therefore be folded more readily; the folding may be carried out by means of methods and apparatus analogous to those generally used for folding layers reinforced with textile cords.

The greater flexiblity, and increased fatigue and buckling resistance of the aforementioned smaller diameter wires when incorporated in a tire breaker according to the invention improves the lateral stability of the tire, leads to greater passenger comfort since it is more able to absorb road irregularities, reduces road noise and increases the traction and braking properties of the tire.

The present invention may be used in tire constructions incorporating the inventions of the assignee's copending patent applications Ser. Nos. 834,614 filed June 17, 1969, 20,266 filed July 16, 1969, 20,267 filed July 16, 1969 and 855, 432 filed Sept. 4, 1969.

What is claimed:

1. A pneumatic tire comprising at least one reinforcement layer having at least one fold therein, the said layer comprising steel wire cords disposed in parallel side-by-side relationship, the individual wires in the cords having a diameter of substantially no greater than 0.003 of an inch.

2. A pneumatic tire according to claim 1 wherein said reinforcement layer comprises a breaker layer.

3. A pneumatic tire according to claim 1 wherein said reinforcement layer comprises a carcass ply.

4. A pneumatic tire according to claim 1 incorporating at least one unfolded layer comprising steel wire cords disposed in parallel side-by-side relationship, the individual wires in the cords having a diameter of substantially no greater than 0.003 of an inch.

5. A pneumatic tire according to claim 1 incorporating at least one unfolded layer comprising steel wire cords disposed in parallel side-by-side relationship, the individual wires in the cords having a diameter of substantially greater than 0.003 of an inch.

6. A pneumatic tire according to claim 2 wherein the breaker is formed with a fold in one circumferentially extending edge.

7. A pneumatic tire according to claim 2 wherein the breaker is formed with a fold on both circumferentially extending edge.

8. A pneumatic tire according to claim 7 incorporating at least one unfolded breaker layer of axial width less than that of the folded breaker layer, the edges of the folded layer embracing the edges of the unfolded layer.

9. A pneumatic tire according to claim 1 with at least one unfolded breaker layer, the said folded layer comprising a narrow strip formed with a circumferentially extending fold and located to embrace the edge of the unfolded layer.

10. A pneumatic tire according to claim 9 wherein two strips are provided, one at each edge of the unfolded layer.

11. A pneumatic tire according to claim 1 incorporating in its tread at least one breaker layer in the form of a squashed tube which extends circumferentially of the tire, the layer being reinforced with steel wire cords disposed in parallel side-by-side relationship, the individual wires in the cords having a diameter of substantially no greater than 0.003 of an inch.

12. A pneumatic tire according to claim 1 wherein the reinforcement layer comprises a carcass ply having a turn up which is formed with at least one circumferentially extending fold located radially outwardly of the tire bead region.

13. A pneumatic tire according to claim 1 wherein the reinforcement layer comprises a chafer strip formed with one circumferentially extending fold located axially outwardly of the tire ply turnup.

14. A pneumatic tire according to claim 1 wherein the reinforcement layer is formed from convolutions of steel wire cords comprising individual wires having a diameter of substantially no greater than 0.003 of an inch progressively wound to extend obliquely continuous lengths from one side of the layer to the other and back in zigzag formation, the included angle between successive lengths measured adjacent to the peripheral edge of the winding, being substantially less than 180° and successive convolutions being slightly displaced so that they are distributed substantially uniformly around the finished layer, the finished layer having at any transverse cross section an inner surface of parallel lengths of steel wire cords lying obliquely and in an opposed direction to adjacent supposed parallel lengths of steel wire cords forming an outer surface.

15. A pneumatic tire according to claim 1 wherein the cords of the layer each comprise two yarns folded together with substantially 7 ½ turns per inch to form each cord.

16. A pneumatic tire according to claim 1 wherein the individual wires have a diameter of substantially 0.0016.